United States Patent [19]

Franz et al.

[11] 4,360,544
[45] Nov. 23, 1982

[54] ORGANOTIN SURFACE TREATMENT AND INTERLEAVING MATERIAL FOR GLASS SHEETS

[75] Inventors: Helmut Franz, Pittsburgh; Paul F. Duffer, Creighton; Joseph D. Kelly, Cheswick, all of Pa.

[73] Assignee: PPG Industries, Inc., Pittsburgh, Pa.

[21] Appl. No.: 229,046

[22] Filed: Jan. 28, 1981

Related U.S. Application Data

[63] Continuation-in-part of Ser. No. 83,084, Oct. 9, 1979, Pat. No. 4,263,371.

[51] Int. Cl.³ .................... B05D 5/06; B05D 5/00; C03C 17/42
[52] U.S. Cl. .................... 427/165; 427/180; 428/426; 428/432; 428/441
[58] Field of Search .............. 427/133, 108, 109, 110, 427/165, 168, 169, 180, 443.2, 384; 428/432, 426, 441

[56] References Cited

U.S. PATENT DOCUMENTS

| | | | |
|---|---|---|---|
| 2,973,089 | 2/1961 | Brichard et al. | 427/27 |
| 3,647,531 | 3/1972 | Matsushita et al. | 427/110 X |
| 3,723,312 | 3/1973 | Hay, Jr. | 252/11 |
| 4,011,359 | 3/1977 | Simpkin et al. | 428/326 |
| 4,200,670 | 4/1980 | Albach | 427/154 |
| 4,263,371 | 4/1981 | Franz | 427/384 |

Primary Examiner—Shrive P. Beck
Attorney, Agent, or Firm—Donna L. Seidel

[57] ABSTRACT

A method is disclosed for protecting glass surfaces in a stack of glass sheets by treating the surfaces with an organotin compound and separating adjacent surfaces with an interleaving material.

9 Claims, No Drawings

ORGANOTIN SURFACE TREATMENT AND INTERLEAVING MATERIAL FOR GLASS SHEETS

CROSS REFERENCE TO RELATED APPLICATION

This application is a continuation-in-part of U.S. Pat. No. 4,263,371 by Helmut Franz entitled "Organotin Treatment for Reducing the Reactivity of a Glass Surface."

BACKGROUND

This invention relates generally to the art of protecting a glass surface from staining and scratches, and relates more particularly to the art of utilizing an organotin compound to accomplish this purpose.

Glass sheets are typically stacked in face-to-face relationship for handling, transportation and storage. Unfortunately, stacked glass sheets are susceptible to scratches caused by relative movement between adjacent surfaces, and staining caused by alkali buildup between adjacent surfaces which degrades the original colorlessness and transparency of the glass.

It is well known in the art to separate adjacent glass surfaces by interposing sheets of paper between the sheets of glass to protect the glass surfaces. However, the techniques for utilizing paper interleaving are time-consuming and costly. Less expensive means for separating glass sheets are particulate interleaving materials, which include natural products, such as wood flour, and synthetic products such as polyethylene, polystyrene or polyacrylate beads. While these inert interleaving materials provide a measure of scratch protection at relatively low cost, staining remains a significant problem.

U.S. Pat. No. 3,723,312 to Hay addresses the problems of staining and scratching of packaged glass sheets. In place of interleaving paper, Hay proposes the use of dedusted agglomerated salicylic acid in conjunction with an inert particulate separator material, such as wood flour or polystyrene, applied at a rate such that one pound of interleaving material protects no more than 4000 square feet, preferably 1000 to 3000 square feet, of glass. According to Hay, use of agglomerated salicylic acid mixed in equal proportion with inert polystyrene is effective to eliminate staining for nearly as long as interleaving paper with application costs which approximate those for wood flour or methyl methacrylate which have no particular stain inhibiting properties.

U.S. Pat. No. 4,011,359 to Simpkin et al discloses an interleaving material for separating glass sheets and protecting them from scratching and staining which comprises a porous, finely divided support material, impregnated with a weakly acidic material, and fine particles of a chemically inert plastic material. The porous support material may be a cellulose material of vegetable origin or a wood flour. The weakly acidic material is a weak organic acid having a first dissociation constant in the range of $10^{-1}$ to $10^{-7}$, preferably organic acids having 3 to 10 carbon atoms, and especially adipic, maleic, sebacic, succinic, benzoic and salicylic acids. The inert plastic separator material may be polyethylene, polystyrene, polytetrafluoroethylene or a methacrylate polyester, and preferably has a larger particle size than the acid-impregnated support material. The interleaving material may be applied to the glass by conventional powder applicators.

U.S. Pat. No. 4,200,670 to Albach describes a method for protecting glass sheets during packing, shipping and storing. The method involves applying water, a stain inhibiting material, and dry, finely divided particles of a mechanical separator to the surface of glass sheets, prior to stacking them, in a plurality of sequential steps that produce an adherent coating on each glass sheet, which coating becomes a protective interleaving between facing surfaces when the sheets are stacked. According to one specific embodiment, this is accomplished by applying the water and stain inhibitor to the glass as an aqueous solution of the latter to provide a wet layer on the sheet surface, and then separately applying a dry particulate layer of a mechanical separator to the wet layer. The method can also be carried out by first spraying the glass surface with water alone and then separately applying a layer or layers of a stain inhibitor and a mechanical separator in dry powdered form to the layer of water, or by first applying a mixture of dry powdered stain inhibitor and mechanical separator and then spraying the dry materials with water.

SUMMARY OF THE INVENTION

The present invention provides a method for protecting a glass surface from staining and scratching by treating the glass surface with an organotin compound prior to dispersing a finely divided particulate interleaving material on the glass surface.

DESCRIPTION OF THE PREFERRED EMBODIMENTS

Glass sheets are treated with an organotin compound, prior to applying a particulate interleaving material, to provide enhanced stain and scratch resistance in the course of handling, stacking, transportation and storage.

Treatment of the glass surface with an organotin compound in accordance with the present invention is carried out as described in U.S. Pat. No. 4,263,371 by Helmut Franz and entitled "Organotin Treatment for Reducing the Reactivity of a Glass Surface", the disclosure of which is incorporated herein by reference. Preferably, the glass surface is contacted with an aqueous solution of the organotin compound by any conventional technique, preferably spraying, at a temperature insufficient to thermally decompose the organotin compound.

The concentration of organotin compound in the solution is preferably greater than 0.1 percent, more preferably in the range of about 0.5 to 1 percent. Preferred organotin compounds are alkyltin compounds, particularly aklyltin halides. Most preferred are methyltin chlorides such as methyltin trichloride, dimethyltin dichloride and mixtures thereof.

In a preferred embodiment of the present invention, an aqueous solution of about 0.5 to 1 percent methyltin chloride, which has a pH of about 2.1, is sprayed onto a glass surface. Excess solution is removed by means of an air knife. The solution remains in contact with the glass for a sufficient time that the methyltin chloride remains on the glass surface after the excess solution is removed. The methyltin chloride treated glass surfaces are separated by any suitable spacing material such as interleaving paper, or preferably particulate solid interleaving materials. While various synthetic support materials such as polyethylene, polystyrene, polytetrafluoroethylene and polyacrylate are acceptable, porous cellulose materials such as wood flour are preferred.

It appears that the acidic nature of the organotin compounds, particularly alkyltin halides, neutralizes alkali buildup between stacked glass sheets which is believed to cause the staining which typically occurs on the surface of packaged glass sheets. In addition, the organotin treatment provides a lubricity to the glass surface which provides increased protection against scratching.

The present invention will be further understood from the description of specific examples which follow.

EXAMPLE I

Sheets of soda-lime-silica float glass are dipped for 5 minutes in an aqueous solution containing one percent of a methlytin chloride composition comprising 80 percent by weight dimethyltin dichloride and 20 percent by weight methyltin trichloride. The sheets are dried, dusted with wood flour, stacked, and placed in a humidity chamber for accelerated staining tests. After exposure to conditions of 140° F. (about 60° C.) and 100 percent relative humidity for 12 days, both the top and the tin surfaces of the glass exhibit no stain.

EXAMPLE II

For comparison, sheets of soda-lime-silica float glass are dipped for 5 minutes in the methyltin chloride solution of Example I, dried, stacked without interleaving material, and exposed to the same temperature and humidity conditions. After 12 days of exposure, both the top and the tin surfaces of the glass are stained.

EXAMPLE III

For further comparison, sheets of soda-lime-silica float glass are dusted with wood flour interleaving as in Example I, but with no methyltin chloride surface treatment, stacked and exposed to the same temperature and humidity conditions. After 12 days, although the tin surfaces are relatively stain-free, the top surfaces are stained.

EXAMPLE IV

On a larger scale, both surfaces of a freshly-formed and annealed float glass ribbon are sprayed with an aqueous solution containing 0.5 percent of a methyltin chloride composition as described in Example I. Most of the water evaporates from the ribbon which is typically at a temperature of 105° to 130° F. (about 40° to 55° C.). An air-knife drying system is used to remove any excess solution about 20 seconds after spraying. The treated surface, which bears about 6.9 milligrams of methyltin chloride per square foot of glass, is dusted with wood flour using conventional powder application equipment set to distribute one pound of interleaving material to about 20,000 to 25,000 square feet of glass. Sheets of treated glass are stacked and exposed to 140° F. (about 60° C.) at 100 percent relative humidity. For comparison, sheets of glass, not treated with methyltin chloride but dusted with wood flour at the same level of distribution, are also tested. After seven days exposure, the methyltin chloride treated glass shows a slight stain at one edge while the glass only dusted with wood flour is stained throughout. After seventeen days exposure, the methyltin chloride treated glass has only light stain in one corner, while the glass only separated by wood flour is severely damaged over the entire surface.

EXAMPLE V

To evaluate the stain resistance of glass treated in accordance with the present invention under typical conditions of handling, transportation and storage, 60,000 square feet of float glass is treated on line with 0.5 percent methyltin chloride aqueous solution as in Example IV. The glass is packaged and transported to a fabrication plant under usual storage conditions, typically about 1400 pieces of about one square foot surface area per rack. For comparison, glass not treated with methyltin chloride but separated by the same interleaving material is also shipped. Quality control data from the fabrication plant show that 4.2 percent of the glass not treated with methyltin chloride is rejected because of stain, while the methyltin chloride treated glass of the present invention shows no stain among 1596 pieces processed.

EXAMPLE IV

Glass is treated, handled, packaged, transported and fabricated as in Example V except that a 0.25 percent solution of methyltin chloride is used to treat 500,000 square feet of glass. Over 369,000 units are processed with a total rejection rate of 20.9 percent, compared with a total rejection rate of 33 percent for glass previously processed using a conventional interleaving material comprising a powdered mixture of adipic acid and Lucite polymethylmethacrylate beads, and there is no incidence of staining on the glass processed with the interleaving system of the present invention.

The above examples are offered to illustrate the present invention. Various modifications not illustrated are included within the scope of the invention. For example, other organotin compounds, especially those described in U.S. Ser. No. 83,084 filed Oct. 9, 1979 by Helmut Franz, may be used to treat the glass surface. Synthetic interleaving materials such as polyethylene, polystyrene, polytetrafluorethylene and polymethylmethyacrylate, as well as other cellulose materials including paper, may be used in addition to various wood flour products. Various concentrations of organotin compounds as well as distribution rates of particulate interleaving material are effective. Additional stain inhibiting materials may be incorporated either with the organotin treatment, with the interleaving material, or as a separate treatment. The scope of the present invention is defined by the following claims.

We claim:
1. A method for protecting a glass surface which comprises the steps of:
   a. treating the glass surface with an organotin compound at a temperature insufficient to thermally decompose said organotin compound; and
   b. applying to the organotin treated glass surface an interleaving material prior to contacting the glass surface in facing relationship with another glass surface.
2. The method according to claim 1, wherein the glass surface is treated with a solution of an alkyltin halide.
3. The method according to claim 2, wherein the glass surface is treated with an aqueous solution of methyltin chloride.
4. The method according to claim 3, wherein the glass surface is treated with a dilute aqueous solution of a methyltin chloride composition selected from the group consisting of dimethyltin dichloride, methyltin trichloride and mixtures thereof.
5. The method according to claim 1, wherein the interleaving material is a particulate solid.

6. The method according to claim 5, wherein the particulate solid interleaving material is a porous cellulose material.

7. The method according to claim 6, wherein the interleaving material is wood flour.

8. The method according to claim 5, wherein the particulate solid interleaving material is a synthetic polymer.

9. The method according to claim 8, wherein the interleaving material is selected from the group consisting of polyethylene, polystyrene, polytetrafluoroethylene and polymethylmethacrylate.

* * * * *

UNITED STATES PATENT AND TRADEMARK OFFICE
Certificate

Patent No. 4,360,544                      Patented Nov. 23, 1982

Helmut Franz, Paul F. Duffer and Joseph D. Kelly

Application having been made by Helmut Franz, Paul F. Duffer and Joseph D. Kelly, the inventors named in the patent above identified, and PPG Industries, Inc. the assignees, for the issuance of a certificate under the provisions of Title 35, Section 256, of the United States Code, deleting the names of Paul F. Duffer and Joseph D. Kelly as joint inventors, and a showing and proof of facts satisfying the requirements of the said section having been submitted, it is this 8th day of May, 1984, certified that the names of the said Paul F. Duffer and Joseph D. Kelly are hereby deleted from the said patent as joint inventors with the said Helmut Franz.

Fred W. Sherling,
*Associate Solicitor.*